J. R. CRAIGHEAD.
RECORDING INSTRUMENT.
APPLICATION FILED OCT. 17, 1919.

1,415,528.

Patented May 9, 1922.

Inventor:
James R. Craighead,
by *[signature]*
His Attorney

UNITED STATES PATENT OFFICE.

JAMES R. CRAIGHEAD, OF SCHENECTADY, NEW YORK, ASSIGNOR TO GENERAL ELECTRIC COMPANY, A CORPORATION OF NEW YORK.

RECORDING INSTRUMENT.

1,415,528.           Specification of Letters Patent.      Patented May 9, 1922.

Application filed October 17, 1919. Serial No. 331,282.

*To all whom it may concern:*

Be it known that I, JAMES R. CRAIGHEAD, a citizen of the United States, residing at Schenectady, in the county of Schenectady, State of New York, have invented certain new and useful Improvements in Recording Instruments, of which the following is a specification.

This invention relates to a recording instrument of a type adapted to record the quantity to be measured by causing a spark to puncture the record sheet.

One object of my invention is to secure a record of the short circuit current that is more accurate than it has been possible to secure heretofore. In previous types of instruments making use of a spark discharge such as the present one, difficulty is experienced for recording the short circuit current which flows for but a very short period of time, on account of the practical impossibility of securing an even spark discharge for rupturing the record sheet, since, under such circumstances, the voltage of the system fails or reaches a low value. In other types of instruments the sparking voltage is obtained from induction coils but in this type of apparatus the adjustment and maintenance of the contacts in proper relation are always a source of trouble and inconvenience. My invention is designed to overcome these inherent difficulties in a simple and inexpensive fashion.

Other objects of my invention will be apparent as the description proceeds.

Figure 1:
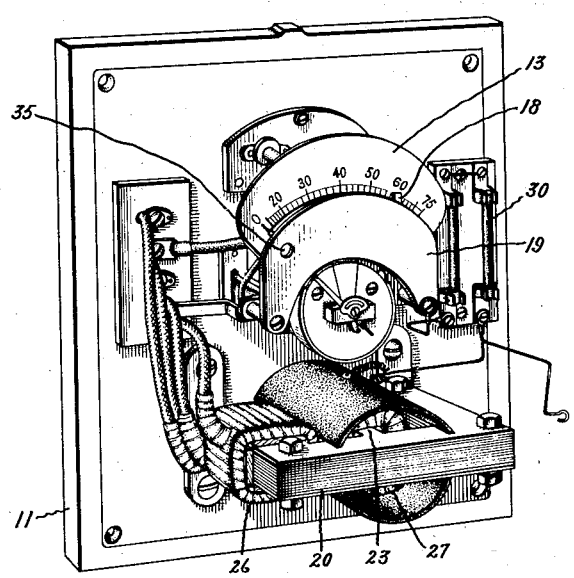
Figure 2:
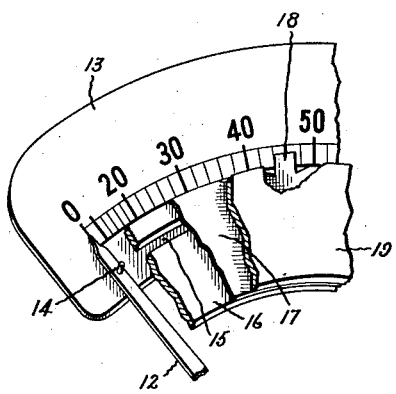
Figure 3:
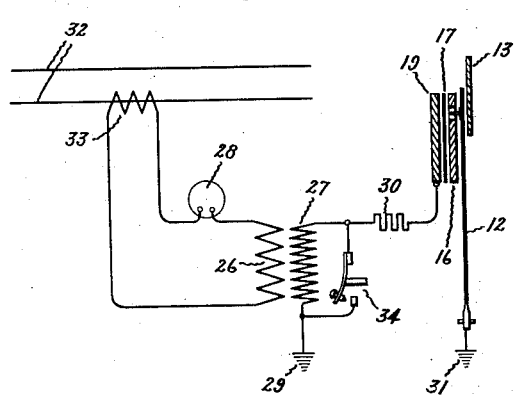
Figure 4:
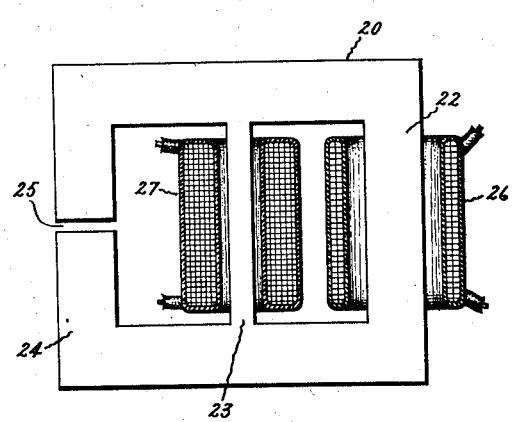

In the drawing, Fig. 1 is a perspective view of the instrument assembled and ready for mounting; Fig. 2 is an enlarged perspective view showing the pointer and the cooperating parts; Fig. 3 is a diagram of connections for the apparatus and Fig. 4 is a view showing in detail one form of construction of the transformer for maintaining constant potential of which I make use.

Referring now more in detail to the drawings wherein like parts are similarly indexed, and wherein one particular embodiment of my invention is illustrated, I show means, such for example as a rectangular base 11 for supporting all the operating parts of the instrument. The ammeter proper comprises the movable pointer 12 adapted to be positioned in accordance with the amount of current flowing through the instrument. The particular details of the movable elements of the ammeter I shall not describe at great length because any well-known means for actuating the pointer 12 may be utilized. Cooperating with such pointer 12 is a stationary calibrated scale 13, appropriately marked so that the value of the indicated quantity may be read. Ordinarily of course, since this instrument is used to record only the short circuit current, and since another instrument is usually present in the system to show the instantaneous value of the current flowing, this scale may be omitted. The pointer 12 carries near its upper end a short pin of conducting material 14, the axis of which is perpendicular to the plane of the movement of the pointer 12. This pin forms a point for a spark discharge and is adapted to move in the circular groove 15, cut in the sheet of insulating material 16. Said sheet 16 is appropriately positioned and held to a stationary part of the instrument. A record sheet 17 of thin paper or the like, which is to be punctured by a spark discharge, is of the same general shape as the part 16 and is placed in close proximity thereto as is clearly shown in Fig. 2. A tab 18 is provided by means of which the record sheet may be inserted and withdrawn from the instrument. Placed immediately over said record sheet 17 is a metallic plate 19 conforming in shape with parts 16 and 17. The exposed end of pin 14 and plate 19 forms a pair of electrodes between which the spark is discharged. As thus far described it is plain that the record sheet 17 is adapted to show the flow of the current by means of the small holes punctured therethrough by the spark discharge referred to above.

Some values of normal current might be sufficient to maintain a sparking voltage across the electrodes. It is desirable to prevent sparking across the contacts during normal conditions because otherwise the contacts will become damaged unnecessarily and energy will be wasted. In order to prevent this the air gap 35 is provided opposite the normal current position of the movable electrode 14. However, on the flow of abnormally large quantities of current, such as during a short circuit, the ammeter pointer 12 advances beyond the air gap 35 and sparking begins between the plate 19 and contact 14 on pointer 12, as by the present arrangement a sparking voltage for this distance is maintained.

For initiating and maintaining the spark discharge use is made of a transformer functioning so as to maintain a satisfactory sparking voltage for producing a substantially constant effect in puncturing the record sheet, even for large variations in current flow. This transformer, for example, may comprise a core 20 having a leg 22 of relatively large cross-section and a leg 23 of relatively small cross-section. The core itself is made up of thin laminæ and also has a leakage flux path 24. This leakage path has an air-gap 25. The entire core structure is plainly shown in Fig. 4.

Wound upon the larger leg 22 of the core 20 is the primary coil 26 and upon the smaller leg 23 the secondary coil 27. The transformer is so designed that even for a large variation of current flow in coil 26 beyond a certain limit, a satisfactory sparking voltage is maintained. This is of course due to the fact that leg 23 is saturated even for comparatively low values of current flow in coil 26. Even though such current is increased the flux through leg 23 is not materially increased since an easier path is found for it through the leakage path 24.

One scheme of connections which may be used with the instrument is shown in Fig. 3. The particular location in the circuit of the current coil 26 is immaterial so long as it is supplied with current proportional to that flowing in the mains 32. The primary coil 26 of the transformer may, for example, be connected in series with the ammeter coil 28. One terminal of the secondary coil 27 is grounded at 29. The other terminal may be connected to a resistance 30, should it be necessary to reduce the current flow. The other terminal of said resistance is connected to the metal plate 19. The pointer 12 is likewise grounded as shown at 31. The primary coil 26 and the ammeter coil 28 are supplied from the mains 32 of the A. C. system through the current transformer 33. For the sake of insuring safety a switch 34 is connected directly across the terminals of the secondary of the voltage coil 27. Said switch is adapted to be opened only when the door of the casings surrounding the instrument is closed. This scheme, being well-known, will not be described in any greater detail. The transformer is so designed that the sparking voltage of a satisfactory value is maintained between the plate 19 and the pin 14 after the current reaches a value higher than is present under normal conditions. In order to insure absolutely that there shall be no sparking discharge while the ammeter is in its zero position an aperture 35 is provided in the metallic plate 19 immediately above the pin 14, when the pointer is at its zero position. In this way the gap from the plate to the pin is materially increased at that portion of the scale, although transformer 20 may, as stated hereinafter, be also so designed that no sparking can occur until the current reaches near abnormal values. When the pointer moves, the air gap is sufficiently reduced so that sparks may be created when a sufficiently high potential is impressed from the coil 27. When there is a short circuit on the alternating current system, whereby the voltage at the mains 32 is reduced to a large extent, the current transformer maintains a satisfactory sparking voltage. The transformer may be so designed that for low or normal current values, the leg 23 is not saturated; in this way, a sparking voltage is reached only for abnormal current values. Once the sparking discharge begins, it continues to the end of the travel of the pointer, and its maximum travel is thus easily ascertainable to show the value of the short circuit current. Should an ordinary potential transformer be used, under short circuit conditions when it is necessary for a spark to be created the voltage for causing such spark would fail and the instrument would thus be incapable of recording the short circuit current. As readily seen, my device obviates these difficulties in a very simple manner.

Other uses besides that described are readily apparent to skilled engineers. The quantity to be measured or recorded need not be merely the current flow and I do not wish to restrict myself to the particular construction described but I aim to cover in the appended claims all modifications falling fairly within the scope of my invention.

What I claim as new and desire to secure by Letters Patent of the United States:

1. An electrical recording instrument of the type in which an electric discharge is caused to make a record on a recording sheet, said discharge passing between two electrodes, one of which is moved relative to the recording sheet in response to the quantity to be measured, characterized by the fact that means are provided for producing said discharge which derives its energy from the measured circuit and is independent of the voltage thereof.

2. An instrument for measuring and recording the instantaneous value of current in a circuit comprising a pair of electrodes cooperating with a recording sheet, one of said electrodes being moved relative to said sheet in response to said current values, means deriving its energy from said circuit for producing a sparking potential between said electrodes, said means being independent of the voltage of said circuit.

3. In an alternating current ammeter of the type adapted to record instantaneous values of current by means of sparking electrodes, one of which is moved relative to a recording sheet in response to said current, means for producing a sparking potential across the electrodes comprising a transformer whose primary is connected in series with the ammeter and whose secondary is connected across the electrodes, said transformer being designed to produce substantially constant secondary voltage with varying primary currents of the value to be recorded, whereby the sparking potential produced is independent of the voltage of the circuit being measured and substantially independent of the current values.

4. An instrument for measuring and recording the value of electric current flowing in a circuit comprising a pair of sparking electrodes cooperating with a recording sheet, means responsive to said current value for moving one of said electrodes relative to said sheet, and means for producing a sparking potential between said electrodes and through said sheet, said means being dependent only upon said current and producing a sparking potential substantially independent thereof.

5. In combination an electric circuit, a recording instrument having an element movable in response to the current in said circuit, said movable element carrying an electrode which cooperates with another electrode and a recording sheet, and means for producing a sparking potential between said electrodes, said means comprising a series transformer whose primary is traversed by the current in said circuit and whose secondary is connected across the electrodes.

6. A recording instrument adapted to measure and record an abnormal condition of an electric circuit comprising an electrode adapted to be moved relative to a recording sheet in response to said abnormal condition, a cooperating electrode, means for producing a substantially constant sparking potential between said electrodes and through the recording sheet, and an air gap in the cooperating electrode opposite the normal condition position of the movable electrode whereby the sparking between said electrodes occurs only during abnormal conditions.

7. A method of producing a substantially constant sparking potential across the electrodes of an ammeter of the spark recording type, which potential is independent of the voltage of the circuit being measured, which consists in supplying said sparking potential from the secondary of a transformer whose primary is connected in series with said circuit and shunting excess flux from the magnetic circuit of said secondary coil.

In witness whereof, I have hereunto set my hand this 16th day of October, 1919.

JAMES R. CRAIGHEAD.